US008717716B2

(12) United States Patent
Häfner et al.

(10) Patent No.: US 8,717,716 B2
(45) Date of Patent: May 6, 2014

(54) DEVICE AND METHOD TO BREAK THE CURRENT OF A POWER TRANSMISSION OR DISTRIBUTION LINE AND CURRENT LIMITING ARRANGEMENT

(75) Inventors: Jürgen Häfner, Ludvika (SE); Björn Jacobson, Ludvika (SE)

(73) Assignee: ABB Technology AG, Zurich (CH)

( * ) Notice: Subject to any disclaimer, the term of this patent is extended or adjusted under 35 U.S.C. 154(b) by 95 days.

(21) Appl. No.: 13/509,974

(22) PCT Filed: Nov. 16, 2009

(86) PCT No.: PCT/EP2009/065233

§ 371 (c)(1), (2), (4) Date: Aug. 3, 2012

(87) PCT Pub. No.: WO2011/057675

PCT Pub. Date: May 19, 2011

(65) Prior Publication Data

US 2012/0299393 A1 Nov. 29, 2012

(51) Int. Cl.
*H02H 3/00* (2006.01)

(52) U.S. Cl.
USPC .................................................. 361/8; 361/62

(58) Field of Classification Search
USPC .................................................. 361/8–12, 62
See application file for complete search history.

(56) References Cited

U.S. PATENT DOCUMENTS

| | | | | |
|---|---|---|---|---|
| 3,651,374 | A | 3/1972 | Faust | |
| 5,164,872 | A | 11/1992 | Howell | |
| 5,517,378 | A * | 5/1996 | Asplund et al. | 361/4 |
| 7,508,636 | B2 * | 3/2009 | Sellier et al. | 361/8 |

FOREIGN PATENT DOCUMENTS

| | | | |
|---|---|---|---|
| DE | 102007042903 | A1 | 1/2000 |
| DE | 10002870 | A1 | 8/2001 |
| EP | 0867998 | B1 | 3/2007 |
| EP | 1377995 | B1 | 7/2009 |
| JP | 11-234894 | A | 8/1999 |

* cited by examiner

*Primary Examiner* — Danny Nguyen
(74) *Attorney, Agent, or Firm* — Birch, Stewart, Kolasch & Birch, LLP

(57) ABSTRACT

A device (13) to break an electrical current flowing through a power transmission or distribution line (14) comprises a parallel connection of a main breaker (8) and a non-linear resistor (11), where the main breaker (8) comprises at least one power semiconductor switch of a first current direction. The device (13) further comprises a series connection of a high speed switch (10) comprising at least one mechanical switch and of an auxiliary breaker (9), the auxiliary breaker having a smaller on-resistance than the main breaker (8) and comprising at least one power semiconductor switch of the first current direction. The series connection is connected in parallel to the parallel connection. In a method to use the device (13) first the auxiliary breaker (9) is opened, thereby commutating the current to the main breaker (8), afterwards the high speed switch (10) is opened and afterwards the main breaker (8) is opened thereby commutating the current to the non-linear resistor (11). The device (13) can further be used in a current limiting arrangement.

43 Claims, 6 Drawing Sheets

DEVICE AND METHOD TO BREAK THE CURRENT OF A POWER TRANSMISSION OR DISTRIBUTION LINE AND CURRENT LIMITING ARRANGEMENT

The invention relates to a device to break an electrical current flowing through a power transmission or distribution line comprising a parallel connection of a main breaker and a non-linear resistor, the main breaker comprising at least one power semiconductor switch of a first current direction. Further, the invention relates to a method to use the device, where the device is connected in series with the power transmission or distribution line. Even further, the invention relates to a current limiting arrangement comprising at least two of the above mentioned devices.

Originally, the invention was made with respect to the field of high voltage DC breakers, i.e. of switching devices which are able to break a current flowing through a power transmission line, where the line is at a voltage level above 50 kV. However, the invention is also applicable to breakers for medium voltage DC power distribution, i.e. for a DC voltage range between about 1 kV and 50 kV, and some embodiments of the invention are even applicable to breakers for AC power transmission and distribution at any voltage level, as is described below.

In EP 0867998 B1, it is suggested to use a parallel connection of at least one power semiconductor switch and a surge diverter to interrupt the current through a High Voltage Direct Current (HVDC) network. The idea behind this is to provide a solid state DC breaker which reacts much faster to a tripping signal than a commonly known mechanical DC breaker and which thereby reduces the risk of the development of damaging high currents in the HVDC network in case of a fault.

In practice, solid state DC breakers, i.e. breakers able to break a DC current and comprising at least one power semiconductor switch, are not used for HVDC power transmission systems, yet, because of the high current losses of such breakers. This is due to the fact that the high operating voltage on one hand and the comparatively low rated voltage of a single power semiconductor switch currently available on the market on the other hand make it necessary that the solid state DC breaker is built up of a considerable number of series connected power semiconductor switches. This number can easily reach several hundreds in case of an HVDC voltage level of several hundred kV. During normal operation of the HVDC power transmission system, the DC breaker and thereby all of its power semiconductor switches are to be turned on, exposing the power semiconductor switches to continuous current stress. The resulting steady-state losses amount to between 0.2 and 0.3% of the energy transferred through the DC breaker. In case of a solid state DC breaker suitable for a line voltage of 640 kV and a normal rated current of 2 kA, these steady-state losses equal to 3 MW which is as much as about one half of the losses of a known HVDC power converter for 640 kV. The losses result in significant costs during the lifetime of the solid state breaker, especially in the case where many solid state breakers are to be used, for example in future DC grid applications with several DC switchyards.

In EP 1377995 B1, a mechanical switch is presented which is among others suitable to be used in parallel to a solid state breaker in order to reduce the steady-state losses of the breaker. The mechanical switch has a plurality of breaking points arranged in series with each other which are operated simultaneously and, compared to other mechanical switches, at high speed, i.e. in the time range of about 1 ms. When the solid state breaker is in the closed state, the mechanical switch is closed as well and conducts the current, while the power semiconductor elements of the breaker are current free and thereby loss-free. If a breaking operation is to be performed, at first the mechanical switch is opened so that the current is commutated over to the breaker and afterwards the breaker is opened.

This arrangement has two main disadvantages. On the one hand, the mechanical switch is actively breaking the current in order to commutate it to the solid state breaker. This results in arcs which occur at the breaking points of the switch and lead to an early wear of the corresponding contacts thereby requiring maintenance of the switch after a couple of switching operations only. On the other hand, it is to be noted that the mechanical switch is intended for a voltage range of 12-36 kV. Accordingly, for high voltage applications of several hundred kV, a series connection of multiple mechanical switches will be necessary. In order to ensure that the voltage is distributed evenly across the series connected switches, especially for the case that the operating speeds differ slightly between the switches, parallel connected capacitors are required. This increases the equipment costs considerably.

It is an object of the present invention to find an alternative solution for a HVDC breaker with which the steady-state losses of power semiconductor switches are reduced, while at the same time avoiding the disadvantages described above in connection with EP 1377995 B1.

This object is achieved by a device and a method according to the independent claims.

According to the invention, the device to break an electrical current flowing through a power transmission or distribution line, also called breaking device, comprises—apart from the known parallel connection of a main breaker and a non-linear resistor, with the main breaker comprising at least one power semiconductor switch of a first current direction—, a series connection of a high speed switch comprising at least one mechanical switch and an auxiliary breaker, where the series connection is connected in parallel to the parallel connection. The auxiliary breaker has a smaller on-resistance than the main breaker and comprises at least one power semiconductor switch of the first current direction. The term on-resistance refers to the resistance for a current flowing through a power semiconductor switch which is turned on. In other words, the auxiliary breaker has a lower conduction voltage drop than the main breaker.

The device according to the invention is suggested to be used in the following way: the device is to be connected in series to a current path going through a power transmission or distribution line, preferably a HVDC power transmission line, and, under normal operation, the auxiliary breaker and the high speed switch of the device are to be closed, which means for the auxiliary breaker that the respective power semiconductor switches are to be turned on. The main breaker is closed, i.e. its semiconductor switches are turned on, at an appropriate point in time before the auxiliary breaker is opened again. If afterwards an auxiliary breaker opening signal is received, the auxiliary breaker is opened thereby commutating the current to the main breaker, then the high speed switch is opened and at last the main breaker is opened if a main breaker opening signal is received. As a result, the current commutates over from the main breaker to the non-linear resistor, where the current level is reduced and the voltage limited. As becomes clear from this method, the high speed switch is needed to decouple the auxiliary breaker from the line in order to prevent that the full voltage is applied to the auxiliary breaker.

The device and the proposed method of its use according to the invention have among others the following advantages, in particular for high voltage DC applications:

The steady-state losses are reduced, since during normal operation the current no longer flows through the main breaker but instead through the high speed switch, which is a mechanical switch with almost no losses at all, and through the auxiliary breaker which has a lower on-resistance and thereby a lower conduction voltage drop than the main breaker. Since the steady-state losses in the main breaker disappear, the main breaker is no longer prone to thermal overload so that an active cooling of the main breaker is no longer required. For the auxiliary breaker, it is preferred that the conduction voltage drop and thereby the losses are so much smaller compared to the main breaker that no active cooling is required there either.

To commutate the current to the main breaker, it is no longer a mechanical switch which has to interrupt the current first, but it is the solid state auxiliary breaker instead. Accordingly, problems with wear of mechanical contacts due to arcs are no longer present which reduces the maintenance effort and increases the reliability and the life-time of the overall breaking device. Accordingly, it is sufficient if the high speed switch is just a fast operating disconnector.

Since the main breaker is subject to the full voltage during a limited period of time only after the commutation to the non-linear resistor, it becomes possible to add further power semiconductor switches in the series connection of the main breaker to ensure reliable voltage distribution without adding to the overall losses.

The design of the main breaker is further simplified with respect to the reaction to a failure in one of its power semiconductor switches. In some known power semiconductor switches it is provided that an inoperable switch is automatically short-circuited in order to allow for another, redundant power semiconductor switch to take over operation. However, this short-circuit failure mode can in practice be an unstable mode, the stability of which can be ensured only for a limited period of time. With the proposed device, where both the main and/or the auxiliary breaker may comprise redundant power semiconductor switches, this presents no longer a problem for the main breaker since the main breaker is in full operation only for a very short period of time so that an optimal short-circuit failure mode is not required.

The voltage and current stress on the main breaker and thereby on its power semiconductor switches are considerably reduced, thereby reducing the failure rate of the power semiconductor switches and increasing the reliability of the main breaker.

In case of higher voltages, where the high speed switch comprises not only one but several mechanical switches connected in series, the question of an even voltage distribution across the series-connected switches is no longer an issue as the high speed switch is opened in a no-current and no-voltage situation. Thus, no parallel connected capacitors should be needed which reduces the costs considerably.

In a preferred embodiment of the device, the main breaker has a higher rated voltage blocking capability than the auxiliary breaker. This could for example be achieved by providing as the at least one power semiconductor switch of the main breaker a switch having a voltage blocking capability of several hundred kV, while the voltage blocking capability of the at least one power semiconductor switch of the auxiliary breaker lies at a few kV only. Another possibility to achieve this is to use different types of power semiconductor switches, like for example at least one IGBT (insulated-gate bipolar transistor) for the main breaker and at least one MOSFET (Metal Oxide Semiconductor Field Effect Transistor) for the auxiliary breaker, since it is an inherent characteristics of a MOSFET that it has a smaller voltage breaking capability than an IGBT. Other types of power semiconductor switches which could be used are IGCT (integrated gate-commutated thyristor) or GTO (gate turn-off thyristor). It should be noted that all these types mentioned belong to the group of power semiconductor switches with turn-on and turn-off capability.

In a specific development of this embodiment, the main breaker comprises at least two series-connected power semiconductor switches of the first current direction, the auxiliary breaker comprises at least one power semiconductor switch of the first current direction having the same voltage blocking capability as the power semiconductor switches of the main breaker, and the main breaker always comprises a higher number of power semiconductor switches than the auxiliary breaker.

This embodiment is especially suitable for higher voltage applications, where the voltage level requires that the main breaker is built up of a series-connection of power semiconductor switches. For the auxiliary breaker, the same kind of power semiconductor switch is used, but since the auxiliary breaker does not have to withstand the full voltage, only a few series-connected power semiconductor switches are required, approximately between 1 and maximum 10. For high voltage applications of several hundred kV, where the main breaker comprises a series-connection of up to several hundreds of power semiconductor switches, the difference in the on-resistance between the main breaker and the auxiliary breaker becomes considerable, since for the auxiliary breaker still only one or a few power semiconductor switches are needed. The steady-state losses for the auxiliary breaker are estimated in this case to amount to as little as less than 0.002% of the energy transferred through the device, compared to the above named 0.2 to 0.3% of the main breaker. The above described design issue with respect to redundant power semiconductor switches and the reaction to a failure in one of the power semiconductor switches, is in the device according to the invention only of relevance for the auxiliary breaker where under normal operating conditions the current flows through permanently. But since only a few power semiconductor switches are needed for the auxiliary breaker, the costs for a reliable redundancy solution, for example by connecting one ore two redundant power semiconductor switches in series with the at least one power semiconductor switch, can be kept low.

In a preferred embodiment of the method to use the device, the auxiliary breaker opening signal is generated and sent prior to the generating and sending of a main breaker opening signal. The generating and sending of the auxiliary breaker opening signal and of the main breaker opening signal can be performed by one or several different sensing and/or protection means which monitor the status of the power and transmission line and/or of other electrical devices such as power converters, transformers, other breaking devices or further lines and which in case of a failure send the opening signals wire-bound or wire-less to the device. In the alternative, the one or both opening signals can be generated internally in the device depending on sensing results and/or protection signals received from external sensing and/or protection means, which means that the opening signals may not necessarily be physically sent and received via a data communication bus inside the device but may as well simply be represented as variables in an internal memory. In the latter case, the process of reading any of these variables from the memory is to be understood as receiving the corresponding opening signal.

The advantage with generating and sending the auxiliary breaker opening signal prior to the main breaker opening signal is that this function may be used to improve the response speed of the device to an actual breaking decision by opening the auxiliary breaker before the breaking decision is finally made. In practice, protection means which have to process status and sensing signals from different sources in order to decide whether a failure indeed occurred which requires breaking of the current in the line, need up to several milliseconds before the breaking decision is made and the main breaker opening signal is sent. Known breakers would react after the point in time when this main breaker opening signal is received, i.e. it would be possible that also the auxiliary breaker opening signal is sent only after the breaking decision is made. With the method according to this embodiment, the auxiliary breaker and also the high speed switch will preferably already be opened before the breaking decision is made, so that the reaction time to the breaking decision is reduced to just the very short opening time of the main breaker of only a couple of microseconds since the current is already commutated earlier to the main breaker. Accordingly, a very fast current breaking action taking only a couple of microseconds can be performed without having the disadvantages of the known solid-state breaker based solutions.

For example, as in one of the embodiments of the method, the auxiliary breaker could be opened immediately after a first current limit is exceeded in the power transmission or distribution line. For known current breakers, the corresponding opening signal is not generated directly after a current limit is exceeded but only after further processing and evaluating of measurements. As described above, this further processing takes up to several milliseconds. Opposed to that, in this embodiment the auxiliary breaker opening signal is generated, sent and eventually received immediately after the first current limit is exceeded; and since the auxiliary breaker is able to open within a couple of microseconds, the current is commutated to the main breaker already several microseconds after the exceeding of the limit. As a consequence, the only time limiting factor before the main breaker can actually be opened is the opening time of the high speed switch, which for the currently available switches is about 1 ms. But since, as described above, the generation of the main breaker opening signal takes at least 1 ms itself, the device according to the invention reacts in about the same short period of time to a main breaker opening signal as the known stand-alone solid state DC breaker while avoiding its problems.

The first current limit can for example be defined slightly above the rated thermal current of the power transmission or distribution line or slightly above the rated thermal current of a converter station connected to the line. During opening of the auxiliary breaker and commutating the current over to the main breaker, a certain reduction of the current level due to changes in the conditions in the environment may already occur if the current rise was only temporary and not caused by a fault. If afterwards the main breaker opening signal is not generated due to a relaxation of the formerly critical looking situation, this embodiment would as an additional advantage have helped to protect the power transmission or distribution line against thermal stress.

In a further embodiment of the method, the high speed switch is opened when a first period of time from the opening of the auxiliary breaker has lapsed. This time is preferably chosen long enough for the auxiliary breaker to having had enough time to open completely and short enough to not waste any time, i.e. if the auxiliary breaker is known to need about 10 microseconds to open, the first period of time could be chosen as 20 microseconds.

In a first alternative embodiment, the high speed switch is opened when the current exceeds a second current limit. The second current limit lies advantageously above the first current limit since in a fault situation, the current in the line rises steadily until the main breaker finally opens and decouples the line from the fault.

In a second alternative embodiment, the high speed switch is opened when a signal is received indicating that the current has been commutated successfully to the main breaker.

As was mentioned before, the main breaker opening signal may in some cases not be generated and therefore not received, even though the auxiliary breaker and the high speed switch were already opened. This can for example be due to a transient current increase which is caused by a short term disturbance but which has no serious consequence. In such cases it is suggested in one embodiment of the method that it is checked if no main breaker opening signal is received within a second period of time from the opening of the auxiliary breaker. After the lapse of the second period of time, the high speed switch and the auxiliary breaker are closed again so that normal operation can be continued.

The non-reception of the main breaker opening signal may also be due to a slowly developing fault which not immediately is recognized as such. Therefore, it is suggested in a further development of above embodiment that in case that after the closing of the high speed switch and of the auxiliary breaker the auxiliary breaker opening signal is still received or received again, the auxiliary breaker is again opened first, afterwards the high speed switch is opened and afterwards the main breaker is opened if the main breaker opening signal is received. The steps of opening and closing the auxiliary breaker and the high speed switch can be performed repeatedly until finally the main breaker opening signal is received or, in the alternative, no further auxiliary breaker opening signal is received.

According to a special embodiment, a so called on-line supervision of the device is performed. Under normal operation, the main breaker is in a current-less state which makes it possible that its at least one power semiconductor switch and any further power semiconductor elements being present, such as free-wheeling diodes, can be tested for their operability. The fact that a normal operating condition exists, is recognized at least from the absence of an auxiliary breaker opening signal and of a main breaker opening signal, but of course further sensor information may be used to determine whether the point in time is suitable for performing such an on-line supervision. After the testing of the main breaker being successful, the main breaker may be closed either immediately or later after further processing. The important point is that the main breaker is closed at the latest before the auxiliary breaker is about to be opened.

In addition to the testing of the main breaker, also the auxiliary breaker may under normal operating conditions be brought into a current-less state in order to be tested. The method according to the embodiment for on-line supervision of the auxiliary breaker comprises the following steps:

- opening the auxiliary breaker, thereby commutating the current to the main breaker,
- afterwards opening the high speed switch, thereby testing the operability of the high speed switch,
- afterwards testing the operability of the at least one power semiconductor switch and, if present, of the at least one free-wheeling diode of the auxiliary breaker,
- after successful testing, closing again the high speed switch and the auxiliary breaker.

With the above described on-line supervision, all switching elements of the breaking device, i.e. the main breaker, the auxiliary breaker and the high speed switch, can be tested for their operability without disturbing the normal operation of the connected power transmission line. Such an on-line supervision is not possible with commonly used breakers as they cannot be made current-free without interrupting the current. This means also that operability of a commonly used breaker can not be ensured continuously since off-line supervision is for practical reasons only performed occasionally. As a result, if the last maintenance of such a breaker took place some time ago, it is not certain if the breaker is actually able to work as expected until the breaker is actually put into operation in order to break a current in a fault situation. This unsatisfying situation is much improved by the breaking device described here since it can be tested continuously and since its operability can thereby be ensured with high reliability.

The device and the method described here can be used advantageously in an arrangement, such as a switchyard, comprising at least one further device of the same kind. If this further device is connected to the same current path as the power transmission or distribution line, the further device may be used as a so called backup breaker, i.e. as a breaking device which opens in case that the original device fails to open. The invention provides the advantage that the further device may already be activated in advance when the original device is set into operation but before a failure of the original device is detected. In a special embodiment of the method the following additional steps are performed after reception of the auxiliary breaker opening signal for the original device: first the auxiliary breaker in the further device is opened, afterwards the high speed switch in the further device is opened, then it is checked whether in the original device the current is successfully commutated to the non-linear resistor and if not, in the further device the main breaker is opened. Otherwise, if in the original device the current is successfully commutated to the non-linear resistor, the high speed switch and the auxiliary breaker in the further device are closed again. This way of pre-activating a backup breaking device has the advantage that the time period before a fault is cleared by the switchyard in case that the original breaking device fails, is shortened to just the time needed for the sensing and/or protecting means to generate the main breaker opening signal plus the time until it is finally recognized that the original breaking device failed to open. The main breaker of the backup breaking device then needs only its couple of microseconds to break the current, a time period which is negligible compared to the rest of the time. Due to the shorter time period, the fault current is interrupted earlier than with commonly used breaking devices, i.e. the fault current level which is finally reached is smaller. As a result, the additional equipment of the switchyard such as reactors and arrestor banks can be dimensioned at a smaller scale leading to cost reductions.

The device and the method described here can also be used advantageously in a current limiting arrangement, where the current limiting arrangement comprises at least two of the devices connected in series to each other and in series with a current path through a power transmission or distribution line. In case that a current in the current path exceeds an overcurrent limit a first certain number of the at least two of the devices are operated so that the current is commutated over to the respective non-linear resistors, thereby reducing the current. The term "to operate" is used in order to express that one of the above described methods is used to subsequently open first the auxiliary breaker, then the high speed switch and at last the corresponding main breaker. The basic principle of such a current limiting arrangement is known from EP 0867998 B1, but the arrangement there uses the stand-alone solid-state DC breakers described above, which have the problem of high losses. This problem is overcome when using devices according to the present invention.

An alternative embodiment of a current limiting arrangement comprises at least two parallel connections of a main breaker and a non-linear resistor, where the parallel connections are connected in series with each other and where the main breakers each comprise at least one power semiconductor switch of the same current direction or directions, and a series connection of a high speed switch and of an auxiliary breaker, where the high speed switch comprises at least one mechanical switch and where the auxiliary breaker has a smaller on-resistance than any of the main breakers and comprises at least one power semiconductor switch of the same current direction or directions as the at least one power semiconductor switch of the main breakers.

where the series connection is connected in parallel to the at least two parallel connections.

Accordingly, the only difference to the current limiting arrangement described above lies in that the series connection of high speed switch and auxiliary breaker is present only once here, while it is present as many times as there are main breakers and non-linear resistors in the above described arrangement.

The function of the current limiting arrangement with one high speed switch and auxiliary breaker is the same as that of the arrangement with multiple high speed switches and auxiliary breakers. Accordingly, the arrangement is adapted to first open the one auxiliary breaker, then to open the one high speed switch and afterwards to open a first certain number of the main breakers so that a current through the high speed switch and the auxiliary breaker is first commutated over to the first certain number of main breakers and then to the respective non-linear resistors, where this commutation is performed in case that a current in the current path of the power transmission or distribution line, where the arrangement is connected in series with, exceeds an overcurrent limit.

The first certain number is determined according to an embodiment depending on how far the overcurrent limit is exceeded, and it is determined preferably with the aim to reduce the current so that it falls below the overcurrent limit again and is kept on a predefined current level at least for a certain period of time.

An advantage of using at least two of the above described breaking devices or parallel connections of main breaker and non-linear resistor, respectively, in a current limiting arrangement is the following. The period of time where the current it kept at a predefined level and accordingly does not rise further is in fact a gain for the algorithm of the sensing and/or protecting means. The algorithm gets this additional period of time to be used to evaluate if a fault situation is really present or not. As a result, the final decision on if the current needs to be interrupted or not can be provided with higher accuracy and reliability so that unnecessary current interruptions are avoided. In addition, since the current level is limited, the main breakers of the current limiting arrangement and therefore their power semiconductor switch or switches need to be rated for lesser breaking currents only, which reduces the costs considerably.

In case that a decision to interrupt the current in the current path is finally made by the algorithm of the sensing and/or protecting means, both current limiting arrangements are used as breaking devices themselves. In that case, all of the remaining breaking devices or parallel connections where the respective main breakers are still being closed are operated, so that the current in the current path is commutated to all the non-linear resistors of the current limiting arrangement, thereby breaking the current flow in the current path.

Both current limiting arrangements described above are able to limit the current as long as the thermal energy in their non-linear resistors does not become too high.

According to one embodiment, the thermal energy in the non-linear resistors corresponding to the opened main breakers is monitored and in case that it exceeds a predefined first energy limit, the opened main breakers are closed again and a same first certain number of the at least two devices or of the at least two parallel connections, whose main breakers were previously closed, are operated and thereby their corresponding main breakers are opened.

This can be repeated until the thermal energy in at least one of the non-linear resistors of the current limiting arrangement exceeds a predefined second energy limit. If that happens, the decision to completely interrupt the current in the current path has to be made in any case, independently of the intermediate results of the algorithm of the sensing and/or protecting means.

By opening and closing different parts of the main breakers of the current limiting arrangement in an alternating way, the increase of thermal energy in the corresponding non-linear resistors and thereby their current stress is distributed more evenly between the non-linear resistors so that the current stress for each individual non-linear resistor is kept within tolerable limits for a longer period of time. Accordingly, the necessity to interrupt the current in the transmission line due to exceeding the second energy limit arises later, thereby further prolonging the time available for the algorithm of the sensing and/or protecting means.

In a further development of the embodiment, the current stress of at least one up to all non-linear resistors of the current limiting arrangement is determined and stored in a memory device, for example in form of the product of the current level flowing through the non-linear resistor multiplied with the corresponding period of time, summed up for each opening operation of the corresponding main breaker, or in form of a temperature curve over time. From the current stress, the expected life time can be determined for the respective non-linear resistor, and this information can be used to adapt the alternating way of operating the main breakers of the current limiting arrangement in order to increase the expected life time of the at least one up to all non-linear resistors.

Another upper limit, apart from the second energy limit, which leads to a definite current breaking decision is the case when the current increases, despite the current limiting arrangement being active, and reaches the maximum current level which the main breakers of the current limiting arrangement are defined to be able to break.

In a special embodiment, the current limiting arrangement is used to limit the surge current which can arise in the power transmission or distribution line, to the current path of which the current limiting arrangement is connected to, in case that this line is at first in a de-energized state or is at first pre-charged to a different voltage level than at least one other power transmission or distribution line which is in an energized state and where the line is to be coupled to the at least one other line. In the following, the embodiment is explained for the de-energized line, but it is in the same way applicable to a line which is pre-charged to a differing voltage level.

The surge current arises due to the additional capacitance added suddenly via the previously de-energized line and it can become so high that it would lead to the immediate disconnection of the previously de-energized line again. In today's practice, a so called pre-insertion resistor is used, which is connected temporarily in series with the previously de-energized line and which limits the surge current. According to this special embodiment, the current limiting arrangement takes over the function of the pre-insertion resistor, thereby reducing costs. Before the coupling of the power transmission or distribution line to the at least one energized lines, the current limiting arrangement is in the opened state. The term "opened state" of a breaking device or current limiting arrangement discussed here means that all auxiliary and main breakers as well as all high speed switches of that device or arrangement are opened.

During coupling of the de-energized line to the at least one energized lines, a part of the main breakers of the current limiting arrangement are closed and the other part of the main breakers as well as the high speed switch or switches and the auxiliary breaker or breakers are kept open. After successful coupling, the other part of the main breakers, the high speed switch or switches and the auxiliary breaker or breakers are closed, thereby commutating the current in the current limiting arrangement to the high speed switch or switches and to the auxiliary breaker or breakers. After successful commutation the main breakers could be opened again up until before the auxiliary breaker or breakers are to opened the next time. The part of the main breakers which are to be closed first is chosen to be as many as are needed to limit the surge current in an adequate way so that a disconnection of the previously de-energized line is avoided.

Further embodiments of the device itself are also proposed. In one embodiment of the device, the main breaker and/or the auxiliary breaker comprises at least one power semiconductor switch connected in parallel with the at least one power semiconductor switch of the first current direction. This embodiment is suitable to increase the rated current for the respective breaker, where here the main breaker is dimensioned with respect to the breaking current level and the auxiliary breaker is dimensioned with respect to the level of the continuous current transfer. One advantage with this embodiment is that an increase of the continuous current transfer is possible at minor costs only, since the auxiliary current breaker contains just between one and a few power semiconductor switches, the small number of which would have to be doubled. In addition, the dimensioning of the high speed switch would have to be adjusted. In the former stand-alone solution of a breaking device with only one solid-state main breaker, an increase of the continuous current transfer resulted in a much more expensive breaker device since up to several hundred power semiconductor switches had to be added in parallel. Another advantage is that the design of the main breaker can be simplified compared to the stand-alone solution with respect to current sharing, since the current flows through the main breaker only for a very short period of time, between the commutation from the auxiliary breaker and the opening of the main breaker, so that a possible uneven current distribution between the parallel branches occurs only briefly.

In a further embodiment of the device, both the main breaker and the auxiliary breaker comprise at least one power semiconductor switch connected in parallel to the at least one power semiconductor switch of the first current direction and being of a second current direction. With this embodiment, the device becomes a bi-directional device which is suitable to be used for interrupting both a first current direction and an opposite second current direction. The power semiconductor switches connected in parallel to each other can be individual separate switches or switches integrated in the same semiconductor package.

As is known from the art, the power semiconductor switches may be supplied each with a free-wheeling diode in anti-parallel connection to the corresponding switch. In that case, an alternative embodiment for a bi-directional device is proposed to have in the main breaker and in the auxiliary breaker at least one power semiconductor switch of the second, opposite current direction connected in series with the at least one power semiconductor switch of the first current direction, where this at least one power semiconductor switch of the second current direction as well is connected in anti-parallel with a free-wheeling diode.

The invention and its embodiment will now be explained with reference to the appended drawings in which.

Figure 2:
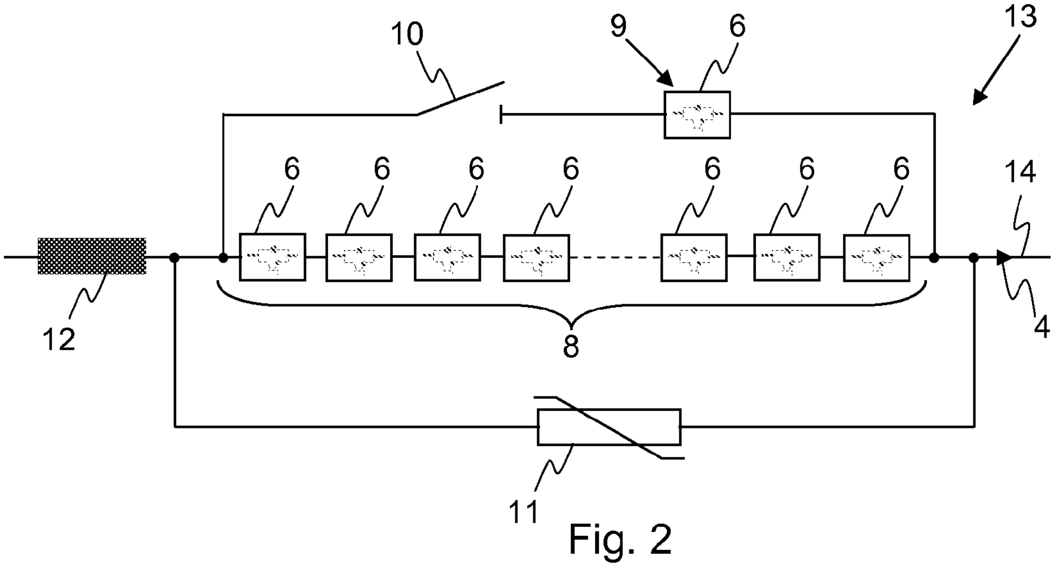
FIG. 2 shows a device according to an embodiment of the invention.
Figure 6:
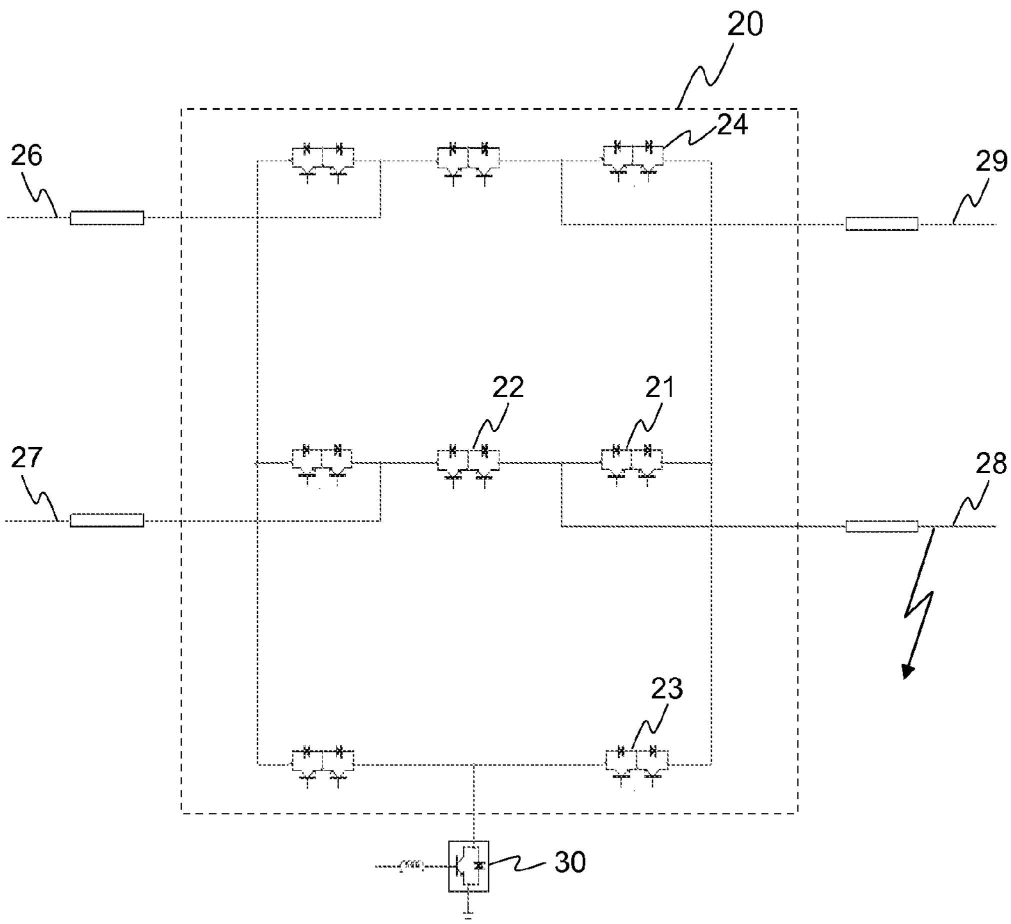
Figure 7:
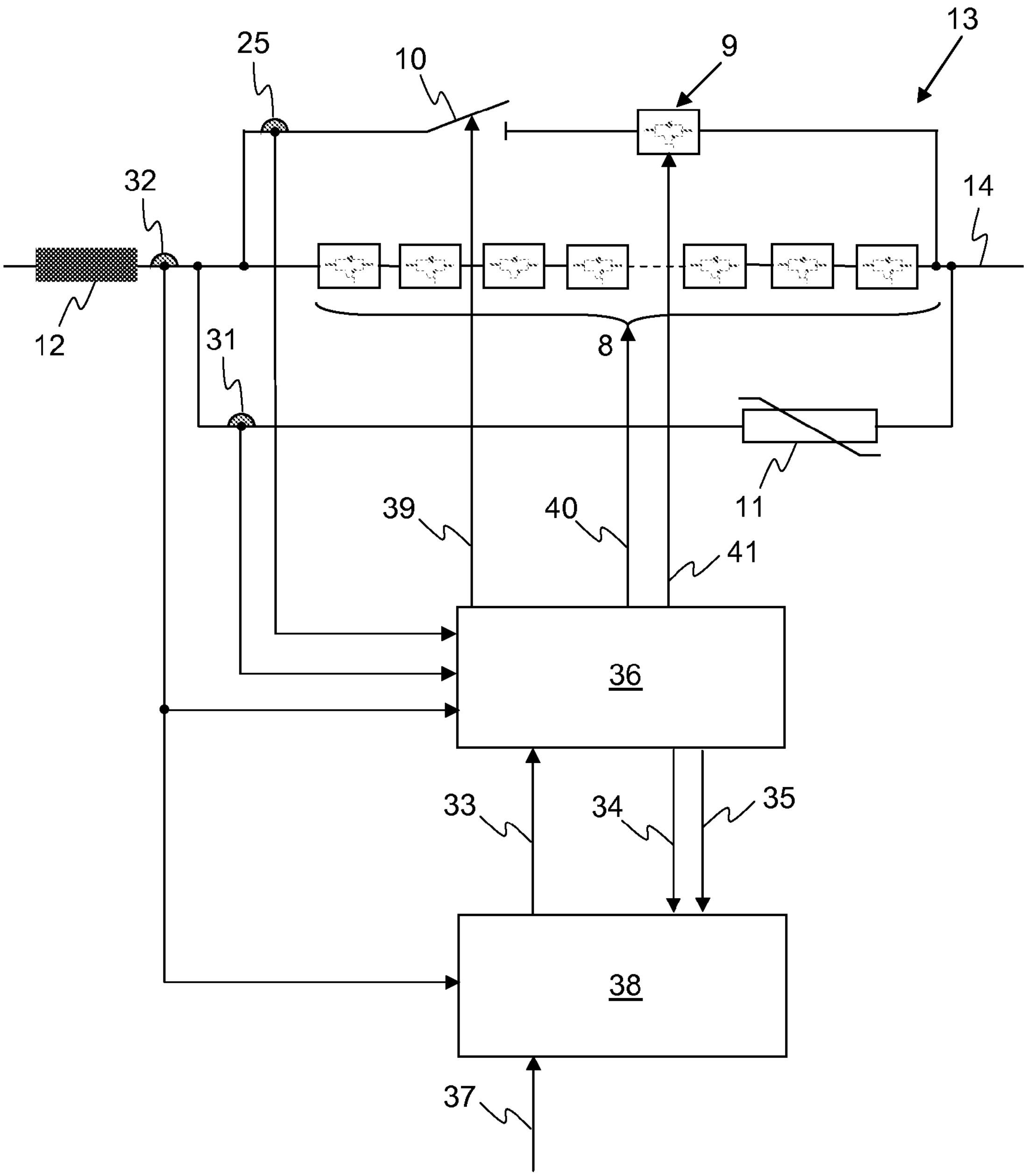
Figure 8:
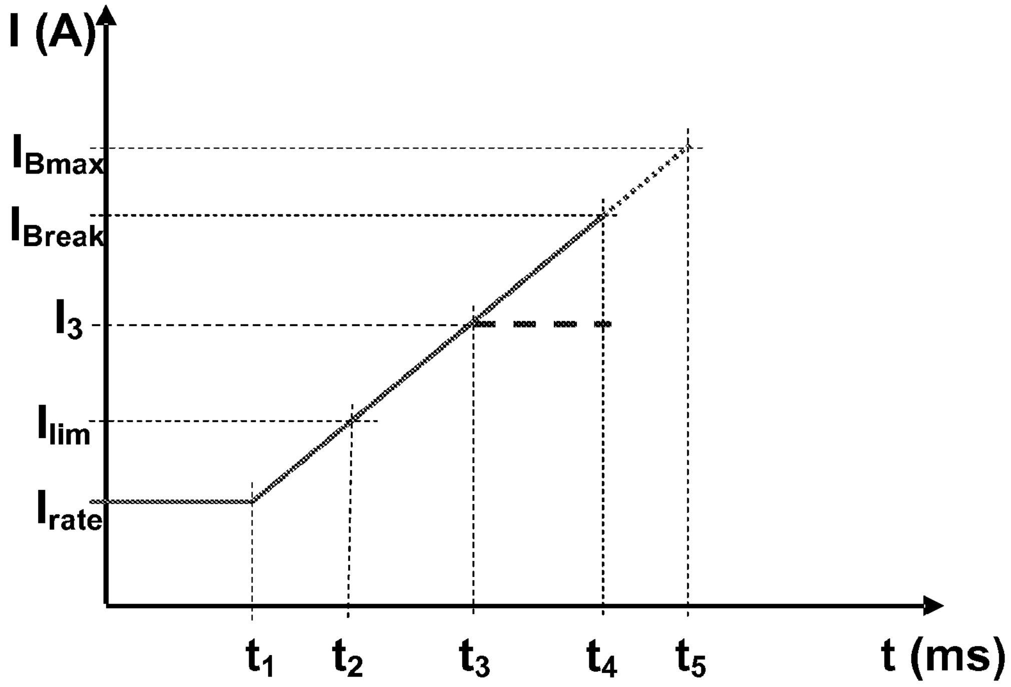
Figure 9:
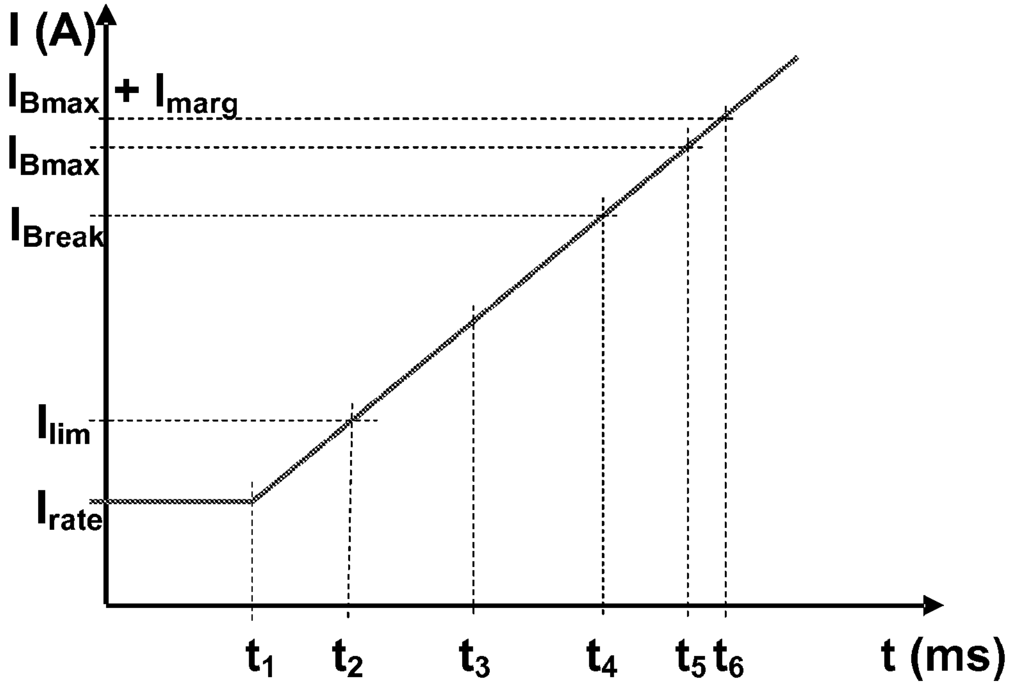
Figure 10:
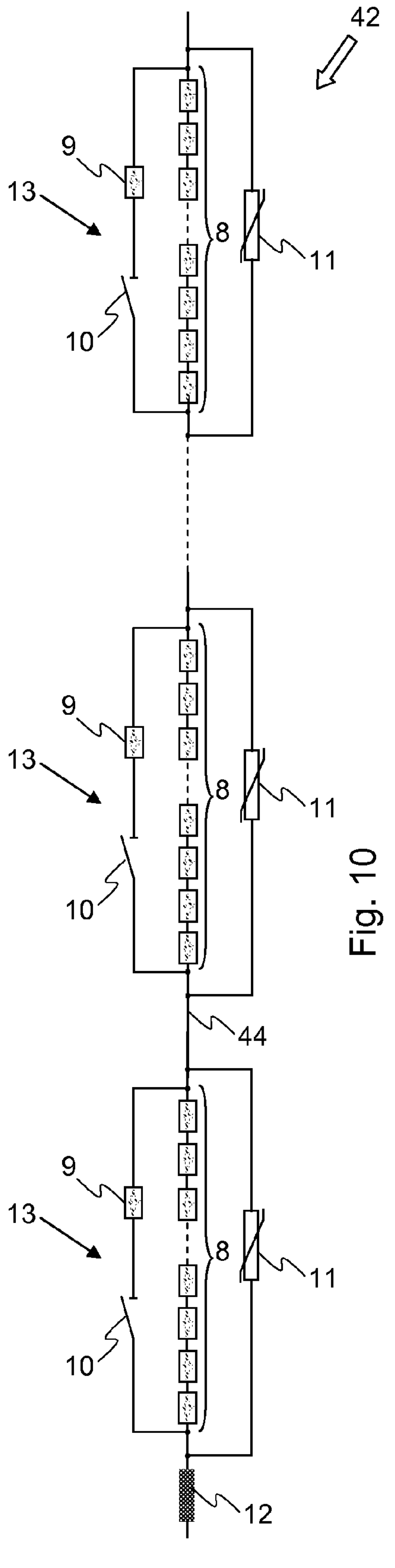
Figure 11:
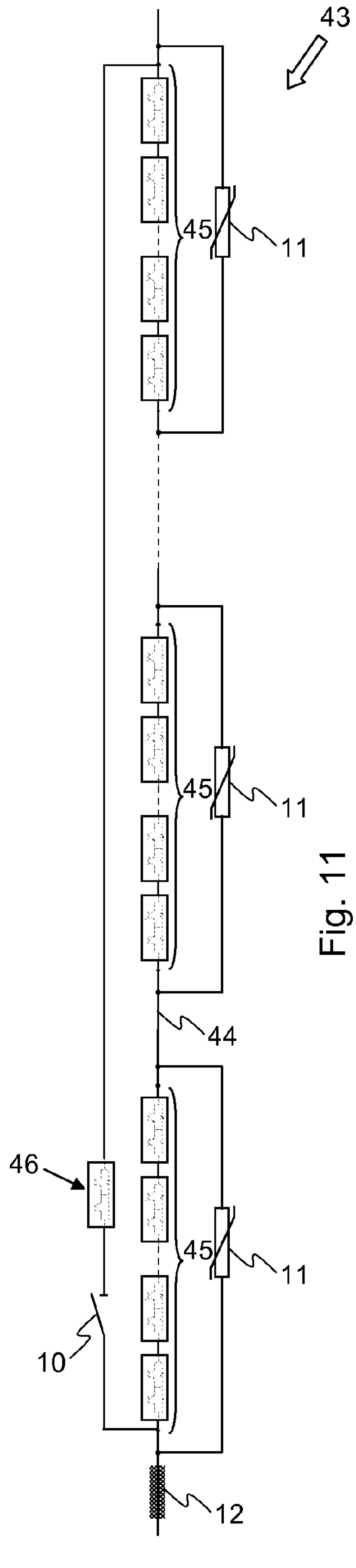
Figure 12:
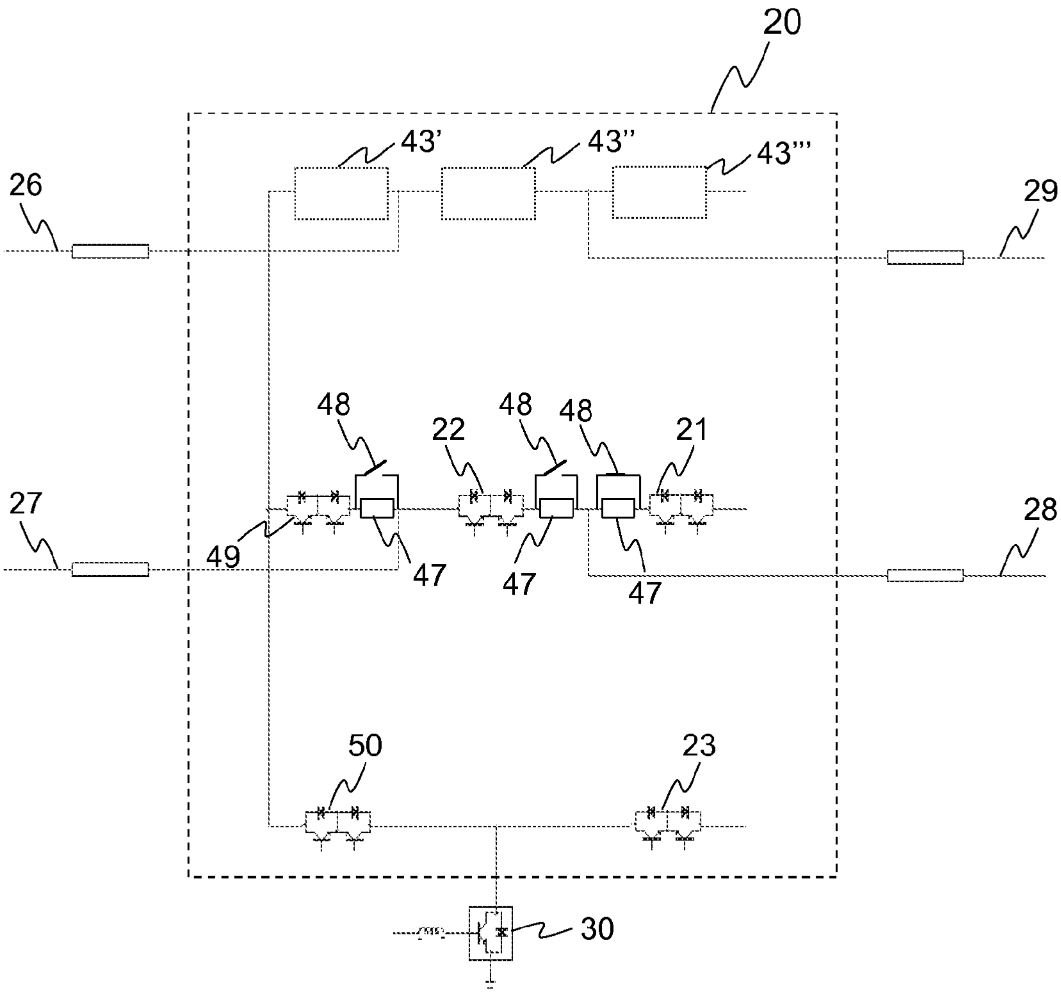

FIG. 6 shows a first embodiment of a switchyard connecting a HVDC converter and four DC power transmission lines, FIG. 7 shows the interaction between the device of FIG. 2 and device control means as well as switchyard control means, FIG. 8 shows the timely sequence of the steps of an embodiment of the method according to the invention, FIG. 9 shows the timely sequence for operating a breaking device and a backup breaking device, FIG. 10 shows a first embodiment of a current limiting arrangement, FIG. 11 shows a second embodiment of a current limiting arrangement, FIG. 12 shows a second embodiment of a switchyard connecting a HVDC converter and four DC power transmission lines.

Figure 1:
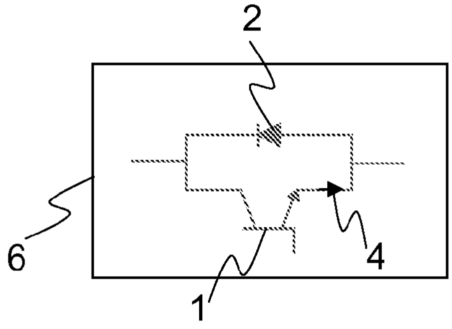
FIG. 1 shows a first example of a base element of a solid-state breaker.

FIG. 1 shows a first base element 6 for solid state breakers used in embodiments of the invention, where the solid state breakers are the main and the auxiliary breakers further explained below. The first base element 6 comprises a power semiconductor switch 1 of a first current direction 4 and a free-wheeling diode 2 connected in anti-parallel to the power semiconductor switch 1.

The first base element 6 is used in an embodiment of the device according to the invention as depicted in FIG. 2. The breaking device 13 of FIG. 2 is suitable for high voltage applications of 50 kV and above, is able to break currents up to about 10 kA and is connected in series with a power transmission line 14. Power transmission line 14 is preferably an HVDC power transmission line. The breaking device 13 comprises a main breaker 8 containing a series-connection of several tens up to several hundreds of base elements 6,—depending on the voltage level—, a non-linear resistor 11 connected in parallel to the main breaker 8 and a series-connection of a high speed switch 10 and an auxiliary breaker 9 connected in parallel to the main breaker 8 and the non-linear resistor 11. The auxiliary breaker 9 contains just one base element 6. The high speed switch 11 is shown as one mechanical switch, but in this example it consists of a series connection of at least two mechanical switches operated simultaneously. In series with the breaking device 13, a reactor 12 is placed for current rate limitation. As can be understood from FIG. 2, the breaking device 13 is able to interrupt a current flowing in the first current direction 4 through the power transmission line 14 only. Accordingly, it is not suitable to be used as an AC current breaker, but it may be used as a DC current breaker over a wide voltage range, starting at approximately 1 kV and rating up to 1000 kV and above, i.e. it may be used in both the fields of power distribution and power transmission.

Figure 3:
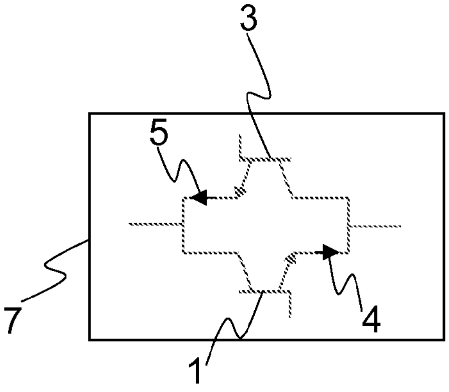
FIG. 3 shows a second example of a base element a solid-state breaker.

In FIG. 3, a second base element 7 for solid state breakers can be seen which comprises a parallel connection of the power semiconductor switch 1 of the first current direction 4 and of a power semiconductor switch 3 of a second, opposite current direction 5.

Figure 4:
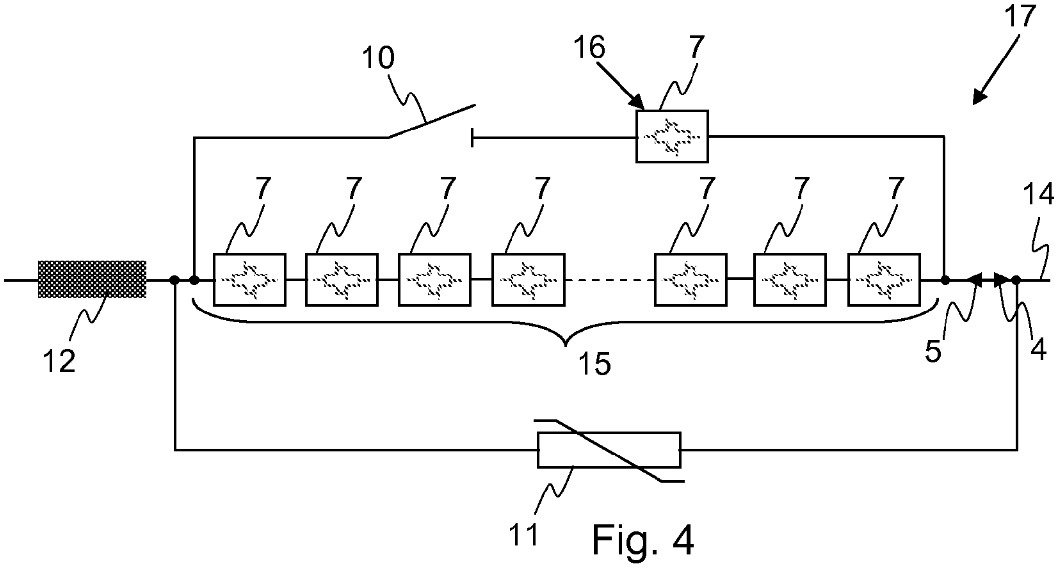
FIG. 4 shows an embodiment of the device in form of a bidirectional device.

The second base element 7 is used in an embodiment of the device according to the invention as shown in FIG. 4. The breaking device 17 of FIG. 4 is a bidirectional breaking device since it is able to break the current in the power transmission line 14 in both, the first current direction 4 and the second current direction 5. The bidirectional breaking device 16 is otherwise similar in its design and function to the breaking device 13, i.e. it is suitable for the same voltage and current range and it contains the same elements with the only difference that the main breaker 15 and the auxiliary breaker 16 comprise second base elements 7 instead of first base elements 6. In addition, since breaking device 17 is a bidirectional breaking device, it may be used as bidirectional DC current breaker, i.e. as DC breaker for both the first and the second current directions 4 and 5, as well as AC current breaker.

From FIG. 8, it can be understood how the breaking device according to the invention can be operated in case of a fault. The method will be explained using uni-directional breaking device 13 as example but it is in the same way applicable to a bidirectional breaking device such as breaking device 17. On the x-axis of the coordinate system of FIG. 8, the time t is shown in milliseconds, and on the y-axis, the current I through the power transmission line 14 is depicted. Before time instant $t_1$, the main and auxiliary breakers, 8 and 9, as well as the high speed switch 10 are closed, where the auxiliary breaker 9 and the high speed switch 10 were closed all the time during normal operation of power transmission line 14, while the main breaker 8 could for example just been closed after some on-line supervision of its functionality has been performed. The rated current $I_{rate}$ is flowing through the high speed switch 10 and auxiliary breaker 9 while the main breaker 8 is current-free. At time instant $t_1$, a line fault occurs in power transmission line 14 which results in a continuous increase of the current I starting from the rated current $I_{rate}$. At time instant $t_2$ which in this example is about 1 ms after time instant $t_1$, a first current limit $I_{lim}$, which is set slightly above the rated thermal current of the power transmission line 14, is exceeded, leading to the immediate generating and sending of an auxiliary breaker opening signal to auxiliary breaker 9. Auxiliary breaker 9 receives the auxiliary breaker opening signal and opens instantaneously within a couple of microseconds, thereby commutating the current $I_{lim}$ to the main breaker 8. From the sending of the auxiliary breaker opening signal it is waited a first period of time until the auxiliary breaker would definitely be opened. If for example the auxiliary breaker usually needs 10 μs to open, the first period of time can be chosen to be 20 μs. Since this first period of time is very short compared to the ms-range shown in FIG. 8, it is not depicted. After the first period of time has lapsed, the high speed switch 10 is opened which in this example will take a little more than 1 ms, so that the high speed switch 10 is finally in the open state at time instant $t_3$. Time instant $t_5$ shows the end of the maximum time interval which an algorithm in a sensing and/or protection means needs to process various input signals before a breaking decision is made and a main breaker opening signal is generated and sent to the main breaker 8. This maximum time interval, calculated from the fault at time instant $t_1$ to the time instant $t_5$ is in this example about 4 ms. At this maximum time instant $t_5$, the current has reached the maximum current level $I_{Bmax}$ which the main breaker is defined to be able to break, i.e. at that point in time the main breaker opening signal will in any case be generated and sent to the main breaker 8. However, the algorithm in the sensing and/or protection means can produce and send the main breaker opening signal at any instant in time after the fault has occurred, i.e. at any point in time after $t_1$. In this example, the main breaker opening signal is received by the main breaker 8 at time instant $t_4$. Should the signal alternatively be available before or until the high speed switch is opened at time instant $t_3$ already, the time instants $t_4$ and $t_3$ would mark the same point in time, i.e. the method would proceed directly at time instant $t_3$ as described below. The main breaker 8 opens instantaneously within a couple of microseconds, so that the time instant when the main breaker 8 is opened and the current is commutated to the non-linear resistor 11 lies so closely after the time instant $t_4$ that it cannot be shown in FIG. 8. The current level $I_{Break}$, flowing at that time instant $t_4$ through the line 14 and thereby through the main breaker, is the current level which the main breaker 8 has actually to break here. It is interesting to note that a voltage surge is likely to occur when the main breaker opens. Since the resulting increased voltage level is applied to the high speed switch, it is to be designed and rated accordingly.

It may be noted that in general any ultra-fast operating switch could be used as auxiliary breaker. The main idea of this invention is that in the series connection parallel to the main breaker, the auxiliary breaker takes over the task of switching and commutating to the main breaker the increased current level $I_{lim}$, which nevertheless lies far below the actual breaking current $I_{Break}$, while the task of withstanding the full high voltage level is fulfilled by the mechanical high speed switch. Assuming that for example an ultra-fast mechanical switch becomes available which could fulfill the same function as the solid-state auxiliary breaker, i.e. the ultra-fast switch would be able to break the current level $I_{lim}$ of for example 2 kA within a very short period of time of significantly less than 1 ms and could withstand the same voltage level of for example 2 kV. In that case, the auxiliary breaker could as well be a mechanical instead of a solid-state switch.

Figure 5:
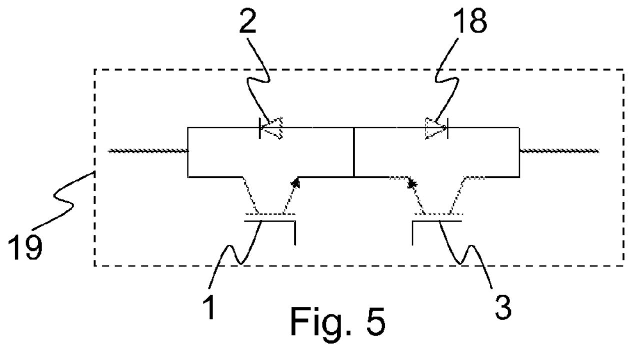
FIG. 5 shows a third example of a base element of a solid-state breaker.

In FIG. 5, a third base element 19 is shown which comprises a series connection of the power semiconductor switch 1 of the first current direction and the power semiconductor switch 3 of the opposite, second current direction. Each power semiconductor switch has a free-wheeling diode 2 and 18, respectively, connected in anti-parallel. The base element 19 is used in FIG. 6 to represent bidirectional breaking devices which are arranged in a switchyard 20, where the bidirectional breaking devices are built-up of the same elements as the bidirectional breaking device 17 with the only difference that the main breaker and the auxiliary breaker both comprise third base elements 19 instead of second base elements 7. Since the general functionality of breaking device 17 and of a breaking device built-up of the third base element 19 are the same, they may be used for the same voltage and current ranges as well as DC, bidirectional DC or AC current breaking applications.

The switchyard of FIG. 6 connects an HVDC converter 30, here depicted as a voltage source converter comprising power semiconductor switches with turn-off capability, with four DC power transmission lines 26-29 of a DC grid. It is assumed that a line fault occurs in DC power transmission line 28. In that case, breaking devices 22 and 21 will have to open in order to disconnect line 28 from the other lines 26, 27 and 29 and thereby from the rest of the DC grid. In very rare cases it may happen that a breaking device fails to open. In order to still be able to disconnect as many lines of the DC grid from the faulty line 28, so called backup breakers or backup breaking devices are defined in the switchyard which will open if their corresponding original breaking device fails to do so. In the example of FIG. 6 it is assumed that breaking device 22 succeeds to open while breaking device 21 fails. The backup breakers for breaking device 21 are breaking devices 23 and 24. In this example, two backup breakers are needed since the current path of power transmission line 28 is split in switchyard 20 into two paths, one leading through breaking device 24 and the other leading through breaking device 23. The time sequence to open an original breaking device followed by a backup breaking device will now be explained with respect to FIG. 9 and by using the example of original breaking device 21 and backup breaking devices 23 and 24.

The x-axis of the coordinate system of FIG. 9, shows again the time t in milliseconds, and the y-axis shows the current I through the power transmission line 28. Before time instant $t_1$, the main and auxiliary breakers as well as the high speed switches of breaking devices 21, 23 and 24 are closed; currents are flowing through the auxiliary breakers and the high speed switches while the main breakers are current-free. The individual level of the current through each breaking device 21, 22, 23 and 24 is determined by the current distribution inside the switchyard. At time instant $t_1$, a line fault occurs in power transmission line 28 which results in a continuous increase of the current I starting from the rated current $I_{rate}$. This increasing current is fed into the switchyard and from there to the rest of the DC grid which is to be prevented by opening both breaking devices 21 and 22. But as said before, breaking device 22 will not be regarded further since it is assumed that its breaking action is successful. At time instant $t_2$, a first current limit $I_{lim}$, which lies slightly above the rated thermal current of the power transmission line 28, is exceeded, leading to the instantaneous generating and sending of an auxiliary breaker opening signal to the auxiliary breakers of both the original breaking device 21 and the backup breaking devices 23 and 24. The auxiliary breakers receive the auxiliary breaker opening signal and open instantaneously within a couple of microseconds, thereby commutating their respective current to their corresponding main breaker. As was already explained with respect to FIG. 8, it is waited for each of the three breaking devices 21, 23 and 24 for a first period of time from the sending of the auxiliary breaker opening signal until the respective auxiliary breaker is expected to be opened before the corresponding high speed switch is opened as well. The high speed switches of breaking devices 21, 23 and 24 are all opened at time instant $t_3$. In this example, a breaking decision is made by sensing and/or protecting means and a main breaker opening signal is generated and sent to the main breaker of original breaking device 21 at time instant $t_4$ which should receive the signal and react instantaneously. However, the main breaker of breaking device 21 fails to open and, accordingly, no current is commutated to the corresponding non-linear resistor. This fact is recognized at time instant $t_5$, which coincides in this example with the time instant at which the main breaker would have had to open at the latest due to the reaching of $I_{Bmax}$. Immediately a main breaker opening signal is generated and sent to the main breakers of backup breaking devices 23 and 24 which will open instantaneously. The reaction time between recognition of a breaker failure at $t_5$ and opening of the one or more backup breaking devices at $t_6$ is therefore only determined by the time until the main breaker of the backup breaker is opened which is extremely short here. Nevertheless, it is depicted with a somewhat exaggerated time period between $t_5$ and $t_6$ in order to explain that the current level which is reached at time instant $t_6$ equals to the maximum current level $I_{Bmax}$ which the main breaker is defined to be able to break plus a backup margin $I_{marg.}$, i.e. the main breakers of the breaking devices of FIG. 6 are in fact designed to be able to break this increased maximum current level ($I_{Bmax}$+$I_{marg}$).

In FIG. 7, an arrangement is shown for explaining an example of the possible interaction between breaking device 13, a device control means 36 and a switchyard control means 38, where it is assumed that breaking device 13 is as well as other breaking devices part of a switchyard which is controlled by the switchyard control means 38. The switchyard control means 38 has as input signals a signal or signals 37 coming from a higher level control and protection system of the grid the power transmission line 14 belongs to, and a current measurement signal taken by a current sensor 32. The current sensor 32 delivers measurements of the current level in the power transmission line 14. From these input signals, the switchyard control means 38 derives decisions on whether one ore more of the breaking devices in the corresponding switchyard are to be opened or closed again. Output signal 37 of switchyard control means 38 is a signal which is sent to device control means 36 and which indicates that breaking device 13 is to be opened, meaning that the current through breaking device 13 is to be interrupted, independently of whether device 13 is to be opened as original breaking device or as backup breaking device. From the device control means 36, the following information is sent back to the switchyard control means: signal 34 which indicates whether the breaking device 13 is arranged to and thereby able to commutate the current to its main breaker 8 prior to the actual breaking decision, and signal 35 indicating that the breaking device 13 failed, i.e. that the current could not be commutated to the non-linear resistor 11. Signal 34 informs the switchyard control means 38 that very short reaction times are possible and that the control and protection algorithms can be adjusted accordingly.

Apart from signal 33, further input signals to device control means 36 are the current measurement signal of current sensor 32 and current indication signals of current indicators 25 and 31. Current indicator 25 indicates whether a current is present in the branch of high speed switch 10 and auxiliary breaker 9 and the other current indicators 31 indicates whether a current is present in the branch of non-linear resistor 11. The current indicators 25 and 31 do not need to take a real current measurement; instead it is sufficient if they can give a yes/no answer to the question of a current flow being present. As was described earlier with respect to FIGS. 8 and 9, the device control means 36 reacts to a current measurement of current sensor 32 which indicates that the first current limit $I_{lim}$ is exceeded in power transmission line 14, and generates the auxiliary breaker opening signal and sends it via connection 41 to auxiliary breaker 9, independently of the input signal 33 from the switchyard control means 38. Afterwards, either when the first period of time has lapsed or, in a first alternative embodiment, when the measurement from current sensor 32 exceeds a second current limit or, in a second alternative embodiment, when current indicator 25 indicates that the current was successfully commutated to the main breaker 8, i.e. that no current is present anymore in the branch of high speed switch 10 and auxiliary breaker 9, an opening signal is sent via connection 39 to high speed switch 10.

As soon as afterwards input signal 33 indicates that breaking device 13 is to interrupt the current in power transmission line 14, the device control means 36 generates the main breaker opening signal and sends it via connection 40 to the main breaker 8. In case that the switchyard control means 38 operates breaking device 13 as original breaker, input signal 33 will have come earlier by the time interval ($t_5$–$t_4$) (see FIG. 9) compared to the case where the breaking device 13 is operated as backup breaker. After the main breaker opening signal 40 is sent out, device control means 36 monitors the signal coming from current indicator 31. If after a predefined period of time after sending out the main breaker opening signal no indication of a successful current commutation to non-linear resistor 11 is received, the device control means 36 sends out signal 35 to the switchyard control means 38 to inform it about the failure of breaking device 13 so that the switchyard control means 38 can activate the backup breaking device of device 13.

If after the opening of high speed switch 10 or, alternatively, after the opening of the auxiliary breaker, a second period of time of for example 100 ms has lapsed during which the device control means 36 has not received any information via signal 33 that the current in line 14 is to be interrupted, the device control means 36 sends out closing signals via connections 39 and 41 to the high speed switch 10 and to the auxiliary breaker 9, respectively. If afterwards the measurement from current sensor 32 still or again exceeds the first current limit, the whole procedure is started again.

FIG. 10 shows a first and FIG. 11 shows a second embodiment of a current limiting arrangement. The current limiting arrangement 42 in FIG. 10 is based on the first base element 6 of FIG. 1 and is therefore operable as uni-directional current limiting device. The current limiting arrangement 42 comprises a series connection of several breaking devices 13 and is connected in series with a power transmission line 44 and with a current limiting reactor 12. The current limiting arrangement 43 of FIG. 11 is based on the third base element 19 of FIG. 5 and is therefore operable as bidirectional current limiting device. Arrangement 43 comprises a series connection of main breakers 45, each comprising at least one third base element 19, where each main breaker 45 has a non-linear resistor 11 connected in parallel. Across the whole series connection of main breakers 45, a series connection of a high speed switch 10 and of an auxiliary breaker 46 is connected in parallel, where the auxiliary breaker 46 comprises at least one third base element 19. The current limiting arrangement 43 is itself connected in series with a power transmission line 44 and with a current limiting reactor 12.

Further embodiments of current limiting arrangements not shown may comprise main breakers as well as one or several auxiliary breakers which are based on the first, second or third base elements and which are arranged in one of the manners shown in FIGS. 10 and 11. Since the second base element 7 works in both current directions, corresponding current limiting arrangements are also operable as bidirectional current limiting devices.

The current limiting arrangement according to the present invention may be used for the same voltage ranges as the above described breaking devices, i.e. for both medium voltage power distribution and high voltage power transmission applications.

A method of use of the current limiting arrangement of FIG. 11 is now described with respect to FIG. 8. Shortly before time instant $t_1$, the main and auxiliary breakers, 8 and 9, as well as the high speed switch 10 are closed. The rated current $I_{rate}$ is flowing through the high speed switch 10 and auxiliary breaker 9 while the main breakers 8 are current-free. At time instant $t_1$, a line fault occurs in power transmission line 44 which results in a continuous increase of the current I starting from the rated current $I_{rate}$. At time instant $t_2$, a first current limit $I_{lim}$, which is set slightly above the rated thermal current of the power transmission line 44, is exceeded, leading to the immediate generating and sending of an auxiliary breaker opening signal to auxiliary breaker 9. Auxiliary breaker 9 receives the auxiliary breaker opening signal and opens instantaneously within a couple of microseconds, thereby commutating the current $I_{lim}$ to the main breakers 8. From the sending of the auxiliary breaker opening signal it is waited a first period of time until the auxiliary breaker would definitely be opened, and then the high speed switch 10 is opened which after some time of for example 1 ms is finally in the open state at time instant $t_3$. At time instant $t_3$, the current has reached an intermediate current level $I_3$ which lies above the first current limit $I_{lim}$ but clearly below the maximum breaking current $I_{Bmax}$. From the difference between the intermediate current level and the first current limit, $(I_3-I_{lim})$, a number of main breakers 8 to be opened in the current limiting arrangement 43 is now determined, which in this example is assumed to be three out of altogether six series connected main breakers 8. Accordingly, three of the main breakers 8 are opened, thereby commutating the current flowing through them over to the corresponding non-linear resistors 11. As a result, the current level does not increase further with the same increase rate as before. Instead, it either increases at a lower rate or, as is depicted in FIG. 8 with a dashed line, remains on the intermediate current level $I_3$, or it even decreases. In the example of FIG. 8, the current remains at the intermediate current level until a final breaking decision, i.e. a decision to fully interrupt the current in the power transmission line 44, is made at time instant $t_4$. The final breaking decision could be made either because the thermal energy in the non-linear resistors 11 of the opened main breakers 8 exceeds an upper limit or because an algorithm in a sensing and/or protecting means evaluates that the fault in the power transmission line 44 requires such a current interruption. Accordingly, at time instant $t_4$, all the main breakers 8 which are still in the closed state are opened as well, which in this example applies to the remaining three main breakers 8. The current commutates over to their corresponding non-linear resistors 11 and is thereby finally interrupted in power transmission line 44. As becomes clear from FIG. 8, the current which the main breakers 8 have to break is in this example the intermediate current level $I_3$, which is considerably smaller than the maximum breaking current $I_{Bmax}$. Assuming the more serious case where the current level increases further despite opening the first three main breakers. Due to the opening of some of the main breakers 8, this increase occurs at least at a lower rate compared to the use of the pure breaking device 13 (or 17). This means that when the maximum time period required for the algorithm of the sensing and/or protecting means to come to a reliable breaking decision is reached, which is designed here to expire at $t_5$, the current level which the remaining main breakers 8 would have to break would in any case lie below the maximum breaking current $I_{Bmax}$ of a pure breaking device. Accordingly, the main breakers 8 could be designed for a smaller maximum breaking current $I_{Bmax}$, which reduces their costs considerably.

The switchyard of FIG. 12 is in some aspects similar to the switchyard of FIG. 6. An HVDC converter 30 and four DC power transmission lines 26-29 of a DC grid. One difference is that the breaking devices which are directly connected to lines 26 and 29 are in FIG. 12 each replaced by a bidirectional current limiting arrangement 43 according to FIG. 11. The current limiting arrangements are referenced by numbers 43', 43" and 43'". Further, in series with each of the breaking devices directly connected to lines 27 and 28, a pre-insertion resistor 47 is connected, and in parallel with each pre-insertion resistor 47, a bypass switch 48 is connected. Under normal operation, the bypass switch 48 is closed, as is shown for the bypass switch corresponding to breaking device 21, in order to disconnect the respective pre-insertion resistor and thereby avoid unnecessary losses. The breaking devices 21, 22 and 49 which are directly connected to lines 27 and 28 as well as the breaking devices 23 and 50 which are directly connected to the HVDC converter 30 are all of the bidirectional type which is based on third base element 19.

It is assumed that line 27 is at first de-energized and disconnected from all other energized lines 26, 28 and 29 and from HVDC converter 30 by breaking devices 22 and 49 being in the opened state. In the alternative, line 27 could be pre-charged to a different voltage level than the other lines 26, 28 and 29. In order to couple line 27 to the rest of the network and to thereby energize it, breaking devices 49 and 22 are closed by closing their main breakers, high speed switches and auxiliary breakers. At the same time, bypass switches 48 of the pre-insertion resistors 47 corresponding to breaking devices 22 and 49 are opened so that surge currents which may rush into line 27 from both the left and the right side of the switchyard are limited. After line 27 is successfully coupled to the other lines, the bypass switches 48 are closed again.

The necessity of having pre-insertion resistors and bypass switches connected in series with each breaking device can be avoided by replacing the breaking devices by any of the above described current limiting arrangements, where the current limiting arrangements takes over the functions of both the breaking device and the pre-insertion resistor and add further advantageous functions as described above. In FIG. 12, it is now assumed that line 26 is at first de-energized. In the alternative, line 26 could be pre-charged to a different voltage level than the other lines 27, 28 and 29. Line 26 is disconnected from all other energized lines 27, 28 and 29 and from HVDC converter 30 by current limiting arrangements 43' and 43" being in the opened state. In order to couple line 26 to the rest of the network and to thereby energize it, current limiting arrangements 43' and 43" are closed in part only by closing a part of their main breakers 45 and by keeping the other main breakers 45, the high speed switch 10 and the auxiliary breaker 46 opened. The surge current is thereby limited through the non-linear resistors corresponding to the part of the main breakers 45 which are kept open. After line 26 is successfully coupled to the other lines, the other main breakers 45, the high speed switch 10 and the auxiliary breaker 46 of current limiting arrangements 43' and 43" are closed so that the current in these current limiting arrangements is commutated to the high speed switch and auxiliary breakers. Afterwards, all the main breakers 45 can be opened again.

The invention claimed is:

1. A device to break a direct electrical current flowing through a power transmission or distribution line comprising: a parallel connection of a main breaker and a non-linear resistor, the main breaker comprising at least one power semiconductor switch of a first current direction, wherein the device further comprises a series connection of a high speed switch comprising at least one mechanical switch and of an auxiliary breaker, the auxiliary breaker having a smaller on-resistance than the main breaker and comprising at least one power semiconductor switch of the first current direction, where the series connection is connected in parallel to the parallel connection; and the device is adapted to open the auxiliary breaker upon receipt of an auxiliary breaker signal prior to a decision to open the main breaker having been taken.

2. A current limiting arrangement comprising at least two of the devices according to claim 1, connected in series with each other and in series with a current path through a power transmission or distribution line, where the arrangement is adapted to operate a first certain number of the at least two devices so that a current through the high speed switches and auxiliary breakers of the at least two devices is commutated over to the respective non-linear resistors in case that the current in the current path exceeds an overcurrent limit.

3. A current limiting arrangement connected in series with a current path through a power transmission or distribution line and comprising:

at least two parallel connections of a main breaker and a non-linear resistor, where the parallel connections are connected in series with each other and where the main breakers each comprise at least one power semiconductor switch of the same current direction or directions, and a series connection of a high speed switch and of an auxiliary breaker, where the high speed switch comprises at least one mechanical switch and where the auxiliary breaker has a smaller on-resistance than any of the main breakers and comprises at least one power semiconductor switch of the same current direction or directions as the at least one power semiconductor switch of the main breakers, wherein the series connection is connected in parallel to the at least two parallel connections, the arrangement is adapted to operate the high speed switch and the auxiliary breaker as well as a first certain number of the at least two parallel connections so that a current through the high speed switch and the auxiliary breaker is commutated over to the respective non-linear resistors of the first certain number of the at least two parallel connections in case that the current in the current path exceeds an overcurrent limit, and the current limiting arrangement is adapted to open the auxiliary breaker upon receipt of an auxiliary breaker signal prior to a decision to open a main breaker having been taken.

4. A current limiting arrangement comprising:

at least two breaker devices connected in series with each other and in series with a current path through a power transmission or distribution line, wherein a breaker device comprises a parallel connection of a main breaker and a non-linear resistor, the main breaker comprising at least one power semiconductor switch of a first current direction, a series connection of a an auxiliary breaker and a high speed switch comprising at least one mechanical switch, the auxiliary breaker having a smaller on-resistance than the main breaker and comprising at least one power semiconductor switch of the first current direction, wherein the series connection of the auxiliary breaker and the high speed switch is connected in parallel to the parallel connection, and wherein the arrangement is adapted to operate a first certain number of the at least two devices so that a current through the high speed switches and auxiliary breakers of the at least two devices is commutated over to the respective non-linear resistors in case that the current in the current path exceeds an overcurrent limit, and wherein the current limiting arrangement is adapted to, upon operation of a first certain number of the at least two devices:

monitor the thermal energy in the non-linear resistors corresponding to opened main breakers, and, if the thermal energy in at least one of the non-linear resistors exceeds a predefined energy limit, completely interrupt the current in the current path.

5. A current limiting arrangement comprising:

at least two breaker devices connected in series with each other and in series with a current path through a power transmission or distribution line, wherein a breaker device comprises a parallel connection of a main breaker and a non-linear resistor, the main breaker comprising at least one power semiconductor switch of a first current direction, a series connection of a an auxiliary breaker and a high speed switch comprising at least one mechanical switch, the auxiliary breaker having a smaller on-resistance than the main breaker and comprising at least one power semiconductor switch of the first current direction, wherein the series connection of the auxiliary breaker and the high speed switch is connected in parallel to the parallel connection, and wherein the arrangement is adapted to operate a first certain number of the at least two devices so that a current through the high speed switches and auxiliary breakers of the at least two devices is commutated over to the respective non-linear resistors in case that the current in the current path exceeds an overcurrent limit, and wherein the current limiting arrangement is adapted to, upon operation of a first certain number of the at least two devices:

monitor the thermal energy in the non-linear resistors corresponding to opened main breakers, and, if the thermal energy in at least one of the non-linear resistors exceeds a predefined energy limit, completely interrupt the current in the current path.

6. A current limiting arrangement according to claim 4, further adapted to, in case the thermal energy exceeds another predefined limit which is lower than said predefined limit, close the opened main breakers and open a same first number of main breakers which previously were in the closed state.

7. A current limiting arrangement comprising:

at least two breaker devices connected in series with each other and in series with a current path through a power transmission or distribution line, wherein a breaker device comprises a parallel connection of a main breaker and a non-linear resistor, the main breaker comprising at least one power semiconductor switch of a first current direction, a series connection of a an auxiliary breaker and a high speed switch comprising at least one mechanical switch, the auxiliary breaker having a smaller on-resistance than the main breaker and comprising at least one power semiconductor switch of the first current direction, wherein the series connection of the auxiliary breaker and the high speed switch is connected in parallel to the parallel connection, and wherein the arrangement is adapted to operate a first certain number of the at least two devices so that a current through the high speed switches and auxiliary breakers of the at least two devices is commutated over to the respective non-linear resistors in case that the current in the current path exceeds an overcurrent limit, and wherein the current limiting arrangement is adapted to operate all of the remaining devices which are still closed so that the current in the current path is commutated over to all the non-linear resistors of the current limiting arrangement in case a third current limit is exceeded, where the third current limit is the maximum current level ($I_{Bmax}$) which the main breakers are defined to be able to break.

8. A current limiting arrangement connected in series with a current path through a power transmission or distribution line and comprising:

at least two parallel connections of a main breaker and a non-linear resistor, where the parallel connections are connected in series with each other and where the main breakers each comprise at least one power semiconductor switch of the same current direction or directions, and a series connection of a high speed switch and of an auxiliary breaker, where the high speed switch comprises at least one mechanical switch and where the auxiliary breaker has a smaller on-resistance than any of the main breakers and comprises at least one power semiconductor switch of the same current direction or directions as the at least one power semiconductor switch of the main breakers, wherein the series connection is connected in parallel to the at least two parallel connections, the arrangement is adapted to operate the high speed switch and the auxiliary breaker as well as a first certain number of the at least two parallel connections so that a current through the high speed switch and the auxiliary breaker is commutated over to the respective non-linear resistors of the first certain number of the at least two parallel connections in case that the current in the current path exceeds an overcurrent limit, and the current limiting arrangement is adapted to open all of the remaining main breakers which are still closed so that the current in the current path is commutated over to all the non-linear resistors of the current limiting arrangement in case a third current limit is exceeded, where the third current limit is the maximum current level ($I_{Bmax}$) which the main breakers are defined to be able to break.

9. The device according to claim 1, where the main breaker has a higher rated voltage blocking capability than the auxiliary breaker.

10. The device according to claim 1, where the main breaker and/or the auxiliary breaker comprises at least one further power semiconductor switch of the first current direction connected in parallel with the at least one power semiconductor switch of the first current direction.

11. The device according to claim 1, where both the main breaker and the auxiliary breaker comprise at least one power semiconductor switch connected in parallel to the at least one power semiconductor switch of the first current direction and being of a second current direction.

12. The device according to claim 1, where the main breaker and the auxiliary breaker each comprise at least one free-wheeling diode, each free-wheeling diode connected in anti-parallel to one of the at least one power semiconductor switches of the first current direction.

13. The device according to claim 12, where the main breaker and the auxiliary breaker each comprise at least one power semiconductor switch of a second current direction having a free-wheeling diode in anti-parallel connection therewith and being connected in series with the at least one power semiconductor switch of the first current direction.

14. The device according to claim 1, adapted to, in case an auxiliary breaker signal has been received and no main breaker opening signal is received within a period of time from the opening of the auxiliary breaker or from opening of the high speed switch, close the high speed switch and the auxiliary breaker again.

15. The device according to claim 1, further comprising a device control means having:

a first input adapted to receive a current measurement from a current sensor adapted to measure the current in the line, and a second input adapted to receive a signal indicating that the device is to be opened, wherein the device control means is adapted to generate an auxiliary breaker signal in response to a received current measurement indicating that a first current limit is exceeded in the power transmission line; and the device control means is further adapted to generate a main breaker opening signal upon receipt of a signal indicating that the device is to be opened.

16. A switchyard for connecting an HVDC converter to a set of transmission lines wherein, for each transmission line, the switchyard comprises original devices according to any one of the above claims and back-up devices according to any one of the above claims, the switchyard further comprising:

a current detection means adapted to generate a current measurement signal indicative of the current level in a first transmission line; and the switchyard being arranged such that, in response to the current measurement signal of the first transmission line having exceeded a current limit, an auxiliary breaker opening signal is generated and sent to both the original devices and the back-up devices of said first transmission line, prior to a decision having been taken to open the main breaker of the original devices of said first transmission line.

17. A method to use a device for breaking a direct electrical current flowing through a power transmission or distribution line, the device comprising:

a parallel connection of a main breaker and a non-linear resistor, the main breaker comprising at least one power semiconductor switch of a first current direction, and a series connection of a high speed switch comprising at least one mechanical switch and an auxiliary breaker, the auxiliary breaker having a smaller on-resistance than the main breaker and comprising at least one power semiconductor switch of the first current direction, wherein the series connection is connected in parallel to the parallel connection, and the device is connected in series to a current path going through a power transmission or distribution line and where the auxiliary breaker and the high speed switch of the device are closed, the method comprising the steps of closing the main breaker, opening the auxiliary breaker if an auxiliary breaker opening signal is received, thereby commutating the current to the main breaker afterwards opening the high speed switch, afterwards opening the main breaker if a main breaker opening signal is received thereby commutating the current to the non-linear resistor, wherein the opening of the auxiliary breaker is performed before a decision to open the main breaker has been taken.

18. The method according to claim 17, for using a first current limiting arrangement, comprising at least two breaker devices connected in series with each other and in series with a current path through the power transmission or distribution line, wherein a breaker device comprises a parallel connection of a main breaker and a non-linear resistor, the main breaker comprising at least one power semiconductor switch of a first current direction, a series connection of a an auxiliary breaker and a high speed switch comprising at least one mechanical switch, the auxiliary breaker having a smaller on-resistance than the main breaker and comprising at least one power semiconductor switch of the first current direction, wherein the series connection of the auxiliary breaker and the high speed switch is connected in parallel to the parallel connection, the method comprising in case that a current in the current path exceeds an overcurrent limit, a first certain number of the at least two devices so that the current is commutated over to the respective non-linear resistors, wherein the opening of the auxiliary breakers is performed before a decision to open the main breakers has been taken.

19. A method of limiting a current through a power transmission or distribution line by use of a current limiting arrangement comprising: at least two breaker devices connected in series with each other and in series with a current path through the power transmission or distribution line, wherein a breaker device comprises a parallel connection of a main breaker and a non-linear resistor, the main breaker comprising at least one power semiconductor switch of a first current direction, a series connection of a an auxiliary breaker and a high speed switch comprising at least one mechanical switch, the auxiliary breaker having a smaller on-resistance than the main breaker and comprising at least one power semiconductor switch of the first current direction, wherein the series connection of the auxiliary breaker and the high speed switch is connected in parallel to the parallel connection, the method comprising in case that a current in the current path exceeds an overcurrent limit, operating a first certain number of the at least two devices so that the current is commutated over to the respective non-linear resistors; wherein operating a device includes opening the auxiliary breaker, thereby commutating the current to the main breaker afterwards opening the high speed switch, and afterwards opening the main breaker;

the method further comprising:

monitoring the thermal energy in the non-linear resistors corresponding to the opened main breakers, and if the thermal energy in at least one of the non-linear resistors exceeds a predefined energy limit, completely interrupt the current in the current path.

20. A method of limiting a current through a power transmission or distribution line by use of a current limiting arrangement comprising:

at least two parallel connections of a main breaker and a non-linear resistor, where the parallel connections are connected in series with each other and where the main breakers each comprise at least one power semiconductor switch of the same current direction or directions, and a series connection of a high speed switch and of an auxiliary breaker, where the high speed switch comprises at least one mechanical switch and where the auxiliary breaker has a smaller on-resistance than any of the main breakers and comprises at least one power semiconductor switch of the same current direction or directions as the at least one power semiconductor switch of the main breakers, where the series connection is connected in parallel to the at least two parallel connections, the method comprising, in case that the current in the current path exceeds an overcurrent limit:

first opening the auxiliary breaker;

afterwards opening the high speed switch, and afterwards opening a first certain number of the main breakers, thereby commutating a current through the high speed switch and the auxiliary breaker first over to the first certain number of breakers and then to the respective non-linear resistors, the method further comprising:

monitoring the thermal energy in the non-linear resistors corresponding to the opened main breakers, and if the thermal energy in at least one of the non-linear resistors exceeds a predefined energy limit, completely interrupt the current in the current path.

21. The method of claim 19, further comprising, in case the thermal energy exceeds another energy limit, closing the opened main breakers and opening a same first certain number of the main breakers which had been previously in the closed state, in case the thermal energy exceeds a predefined limit which is lower than said predefined limit, closing the opened main breakers and opening a same first certain number of the main breakers which had been previously in the closed state.

22. The method according to claim 21, wherein the current stress of at least one non-linear resistor of the current limiting arrangement is determined and stored in a memory device, the expected life time of the at least one non-linear resistor is determined from the determined current stress and the first certain number of the main breakers of the current limiting arrangement, respectively, which are to be opened next are chosen so that the expected life time of the at least one non-linear resistor is increased.

23. A method of limiting a current through a power transmission or distribution line by use of a current limiting arrangement comprising: at least two breaker devices connected in series with each other and in series with a current path through the power transmission or distribution line, wherein a breaker device comprises a parallel connection of a main breaker and a non-linear resistor, the main breaker comprising at least one power semiconductor switch of a first current direction, a series connection of a an auxiliary breaker and a high speed switch comprising at least one mechanical switch, the auxiliary breaker having a smaller on-resistance than the main breaker and comprising at least one power semiconductor switch of the first current direction, wherein the series connection of the auxiliary breaker and the high speed switch is connected in parallel to the parallel connection, the method comprising in case that a current in the current path exceeds an overcurrent limit, operating a first certain number of the at least two devices so that the current is commutated over to the respective non-linear resistors; wherein operating a device includes opening the auxiliary breaker, thereby commutating the current to the main breaker afterwards opening the high speed switch, and afterwards opening the main breaker;

the method further comprises:

operating all of the remaining devices which are still closed so that the current in the current path is commutated over to all the non-linear resistors of the current limiting arrangement in case a third current limit is exceeded, where the third current limit is the maximum current level ($I_{Bmax}$) which the main breakers are defined to be able to break.

24. A method of limiting a current through a power transmission or distribution line by use of a current limiting arrangement comprising:

at least two parallel connections of a main breaker and a non-linear resistor, where the parallel connections are connected in series with each other and where the main breakers each comprise at least one power semiconductor switch of the same current direction or directions, and a series connection of a high speed switch and of an auxiliary breaker, where the high speed switch comprises at least one mechanical switch and where the auxiliary breaker has a smaller on-resistance than any of the main breakers and comprises at least one power semiconductor switch of the same current direction or directions as the at least one power semiconductor switch of the main breakers, where the series connection is connected in parallel to the at least two parallel connections, the method comprising, in case that the current in the current path exceeds an overcurrent limit:

first opening the auxiliary breaker;

afterwards opening the high speed switch, and afterwards opening a first certain number of the main breakers, thereby commutating a current through the high speed switch and the auxiliary breaker first over to the first certain number of breakers and then to the respective non-linear resistors, the method further comprising:

opening the main breakers which are still closed so that the current in the current path is commutated over to all the non-linear resistors of the current limiting arrangement in case a third current limit is exceeded, where the third current limit is the maximum current level ($I_{Bmax}$) which the main breakers are defined to be able to break.

25. The method according to claim 19, where the first certain number is determined depending on how far the overcurrent limit is exceeded.

26. The method according to claim 23, where the thermal energy in the non-linear resistors corresponding to the opened main breakers is monitored and in case it exceeds a predefined first energy limit, the opened main breakers are closed again and a same first certain number of the main breakers, which had been previously in the closed state, are opened.

27. The method according to claim 26, where the current stress of at least one non-linear resistor of the respective current limiting arrangement is determined and stored in a memory device, the expected life time of the at least one non-linear resistor is determined from the determined current stress and the first certain number of the main breakers of the first current limiting arrangement or of the second current limiting arrangement, respectively, which are to be opened next are chosen so that the expected life time of the at least one non-linear resistor is increased.

28. The method according to claim 19, where in case that a decision is made to interrupt the current in the current path, all of the remaining devices of the first current limiting arrangement which are still closed are operated, or all of the remaining main breakers of the second current limiting arrangement are opened, respectively, so that the current in the current path is commutated over to all the non-linear resistors of the respective current limiting arrangement.

29. The method according to claim 28, where the decision to interrupt the current in the current path is made if the thermal energy in at least one of the non-linear resistors of the respective current limiting arrangement exceeds a predefined second energy limit.

30. The method according to claim 28, where the decision to interrupt the current in the current path is made if a third current limit is exceeded, where the third current limit is the maximum current level ($I_{Bmax}$) which the main breakers of the respective current limiting arrangement are defined to be able to break.

31. The method according to claim 19, where the power transmission or distribution line is at first in a de-energized state or is at first pre-charged to a different voltage level than at least one other power transmission or distribution line which is in an energized state, and the first or second current limiting arrangement, respectively, is in the opened state, comprising the steps of closing a part of the main breakers of the first or second current limiting arrangement and keeping open the other part of the main breakers as well as the high speed switch or switches and the auxiliary breaker or breakers while the power transmission or distribution line is coupled to the at least one other power transmission or distribution line, and, after successful coupling, closing the other part of the main breakers, the high speed switch or switches and the auxiliary breaker or breakers.

32. The method according to claim 17, where an auxiliary breaker opening signal is generated, sent and received immediately after the current exceeds a first current limit ($t_1$).

33. The method according to claim 32, where the first current limit ($I_{lim}$) is defined slightly above the rated thermal current of the line or slightly above the rated thermal current of a converter station connected to the line.

34. The method according to claim 17, where the high speed switch is opened when a first period of time from the opening of the auxiliary breaker has elapsed.

35. The method according to claim 17, where the high speed switch is opened when the current exceeds a second current limit.

36. The method according to claim 17, where the high speed switch is opened when a signal is received indicating that the current has been commutated successfully to the main breaker.

37. The method according to claim 17, where a main breaker opening signal is generated, sent and received if a failure occurs in the line and/or in a further electrical device connected to the line ($t_4$).

38. The method according to claim 17, where in case that no main breaker opening signal is received within a second period of time from the opening of the auxiliary breaker or from the opening of the high speed switch, the high speed switch and the auxiliary breaker are closed again.

39. The method according to claim 38, where in case that after the closing of the high speed switch and of the auxiliary breaker the auxiliary breaker opening signal is still received or received again, first the auxiliary breaker is opened, afterwards the high speed switch is opened and afterwards the main breaker is opened if the main breaker opening signal is received.

40. The method according to claim 17, where in the absence of an auxiliary breaker opening signal and of a main breaker opening signal, the main breaker is opened, the operability of its at least one power semiconductor switch and, if present, of its at least one free-wheeling diode is tested, and the main breaker is closed again.

41. The method according to claim 17, where in the absence of an auxiliary breaker opening signal and of a main breaker opening signal, the following steps are performed:

opening the auxiliary breaker, thereby commutating the current to the main breaker, afterwards opening the high speed switch, thereby testing the operability of the high speed switch, afterwards testing the operability of the at least one power semiconductor switch and, if present, of the at least one free-wheeling diode of the auxiliary breaker, after successful testing, closing again the high speed switch and the auxiliary breaker.

42. The method according to claim 17, where a further device is connected to the same current path as the power transmission or distribution line, the further device comprising a parallel connection of a main breaker and a non-linear resistor, the main breaker comprising at least one power semiconductor switch of a first current direction, and a series connection of a high speed switch comprising at least one mechanical switch and an auxiliary breaker, the auxiliary breaker having a smaller on-resistance than the main breaker and comprising at least one power semiconductor switch of the first current direction, wherein the series connection is connected in parallel to the parallel connection, the method comprising, in case that the auxiliary breaker opening signal is received for the device, the following further steps:

first opening the auxiliary breaker in the further device, afterwards opening the high speed switch in the further device, if in the device the current is not successfully commutated to the non-linear resistor, opening in the further device the main breaker, or if in the device the current is successfully commutated to the non-linear resistor, closing the high speed switch and the auxiliary breaker in the further device.

43. The method of claim 19, wherein the opening of the auxiliary breaker is performed before a decision to open the first number of main breakers has been taken.

* * * * *